United States Patent [19]
Schwelb et al.

[11] Patent Number: 5,950,123
[45] Date of Patent: Sep. 7, 1999

[54] CELLULAR TELEPHONE NETWORK SUPPORT OF AUDIBLE INFORMATION DELIVERY TO VISUALLY IMPAIRED SUBSCRIBERS

[75] Inventors: Eric Schwelb, LaPrairie; Vincent Guimont, Blainville, both of Canada

[73] Assignee: Telefonaktiebolaget L M, Ericsson (publ), Sweden

[21] Appl. No.: 08/701,520

[22] Filed: Aug. 26, 1996

[51] Int. Cl.⁶ ........................................... H04Q 7/00
[52] U.S. Cl. .................... 455/414; 455/466; 455/456; 455/38.4; 340/825.44
[58] Field of Search .................. 455/422, 406, 455/414, 466, 550, 563, 575, 31.2, 31.3, 38.2, 38.4; 704/260; 379/201, 217; 340/825.44

[56] References Cited

U.S. PATENT DOCUMENTS

| | | | |
|---|---|---|---|
| 4,465,465 | 8/1984 | Nelson | 434/112 |
| 4,674,112 | 6/1987 | Kondraske et al. | 379/96 |
| 4,754,474 | 6/1988 | Feinson | 379/96 |
| 4,823,384 | 4/1989 | Lindsay | 379/441 |
| 4,926,459 | 5/1990 | Advani et al. | 379/52 |
| 5,043,983 | 8/1991 | Dorst et al. | 370/110.1 |
| 5,121,421 | 6/1992 | Alheim | 379/52 |
| 5,144,294 | 9/1992 | Alonzi et al. | 340/825.49 |
| 5,208,756 | 5/1993 | Song | 364/449 |
| 5,223,828 | 6/1993 | McKiel, Jr. | 340/825.19 |
| 5,287,102 | 2/1994 | McKiel, Jr. | 340/825.19 |
| 5,390,236 | 2/1995 | Klausner et al. | 379/67 |
| 5,430,791 | 7/1995 | Feit et al. | 379/67 |
| 5,434,906 | 7/1995 | Robinson et al. | 379/67 |
| 5,444,768 | 8/1995 | Lemaire et al. | 379/68 |
| 5,511,111 | 4/1996 | Serbetcioglu et al. | 379/67 |
| 5,577,103 | 11/1996 | Foti | 379/59 |
| 5,610,973 | 3/1997 | Comer | 379/59 |
| 5,625,668 | 4/1997 | Loomis et al. | 379/58 |
| 5,680,447 | 10/1997 | Diamond et al. | 379/215 |
| 5,712,899 | 1/1998 | Pace | 379/58 |
| 5,722,083 | 2/1998 | Konig | 455/517 |
| 5,739,759 | 4/1998 | Nakazawa et al. | 340/825.44 |
| 5,826,039 | 10/1998 | Jones | 395/200.36 |

FOREIGN PATENT DOCUMENTS

| | | |
|---|---|---|
| 0 597 638 | 11/1993 | European Pat. Off. . |
| 0 668 686 | 2/1995 | European Pat. Off. . |
| 0 693 860 | 7/1995 | European Pat. Off. . |
| 4340679 | 11/1993 | Germany . |
| 43 40 679 | 6/1995 | Germany . |

OTHER PUBLICATIONS

Giovanni Martini, et al, "Distributed Architecture for Applications Based on the GSM Short Message Service", Jun. 5, 1995, pp. 140–145.

G. P. Eleftheriadis & M. E. Theologou, "User profile identification in future Mobile Telecommunications Systems", Proceeding of IEEE Network, Sep.–Oct. 1994, pp. 33–39.

*Primary Examiner*—Reinhard J. Eisenzopf
*Assistant Examiner*—Duc Nguyen
*Attorney, Agent, or Firm*—Jenkens & Gilchrist, P.C.

[57] ABSTRACT

Cellular telephone network textual messages are conventionally delivered to mobile stations for subscriber presentation on an included display. To accommodate a visually impaired subscriber, however, these textual messages are instead converted to an audible format and delivered to be heard by the subscriber instead of seen. In one embodiment, the textual messages are processed by a network connected audio device (like an announcement machine or a voice synthesizer) to generate an audible message which is then sent over a conventional voice/call connection to the mobile station. In another embodiment, the textual messages are delivered as data messages to the mobile station where a voice synthesizer generates the corresponding audible message for presentation to the subscriber. The textual messages delivered in either embodiment comprise, for example, short message service message, service provider information, charging rate information and location information.

16 Claims, 3 Drawing Sheets

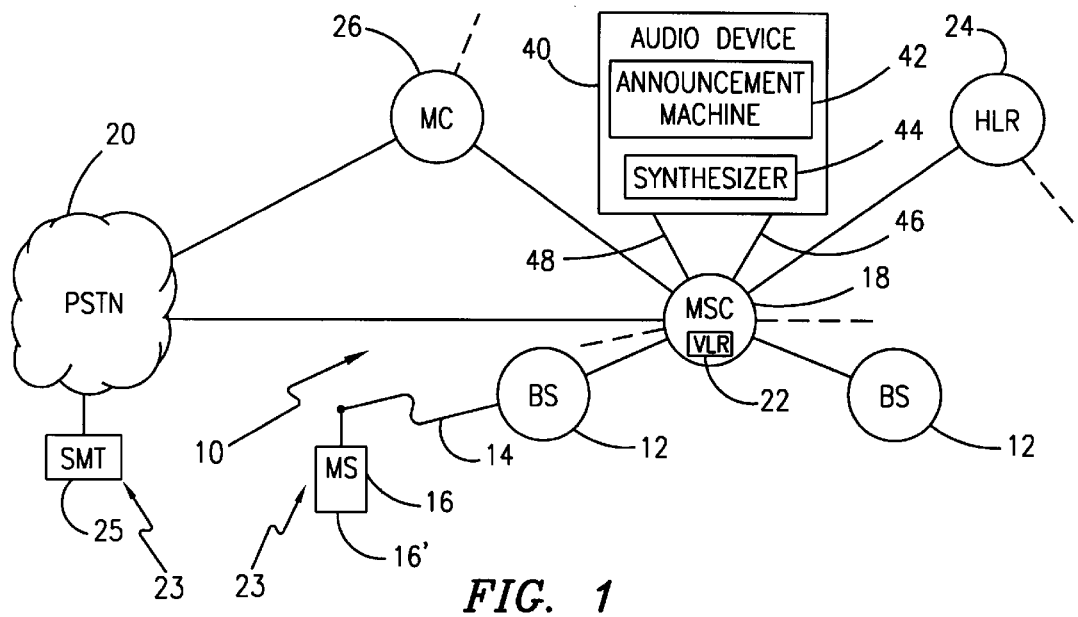
FIG. 1
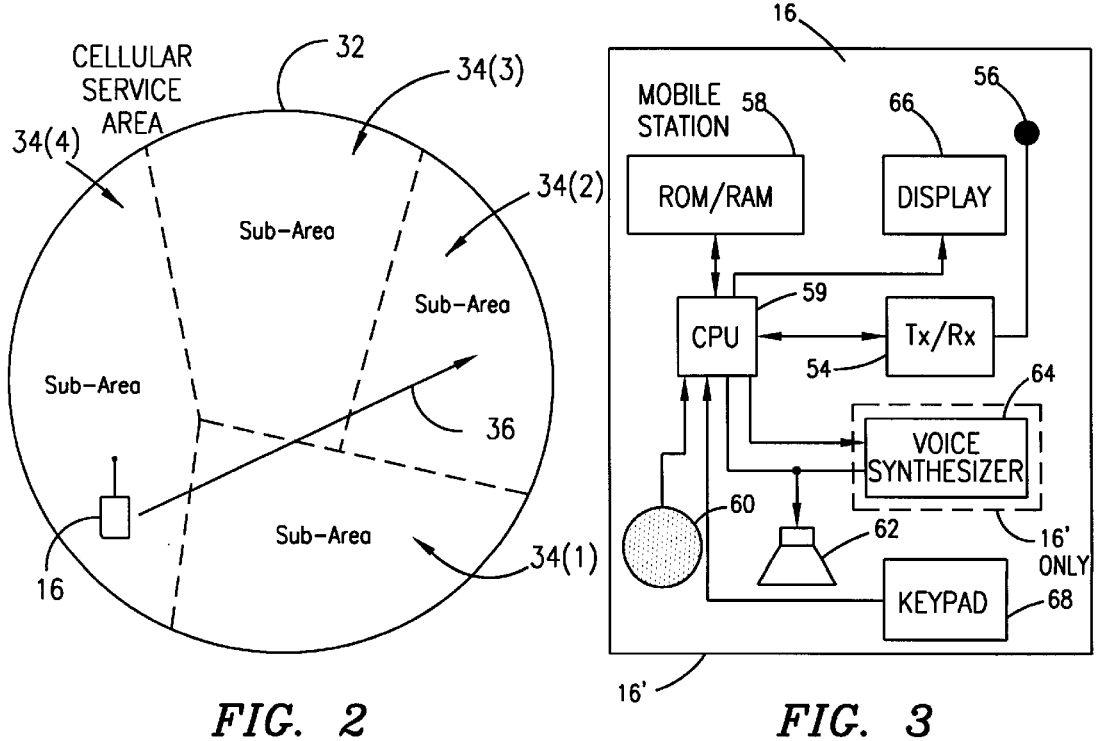
FIG. 2
FIG. 3

CELLULAR TELEPHONE NETWORK SUPPORT OF AUDIBLE INFORMATION DELIVERY TO VISUALLY IMPAIRED SUBSCRIBERS

BACKGROUND OF THE INVENTION

1. Technical Field of the Invention

The present invention relates to cellular telephone networks and, in particular, to a cellular telephone network supporting audible information delivery to visually impaired subscribers.

2. Description of Related Art

Normally sighted subscribers find cellular mobile stations and cellular telephone networks relatively easy to use. However, except for the tones emitted in response to key pad depressions, the ring signal generated in response to an incoming call and the audible call conversation itself, cellular telephones are silent devices. The visual information provided to cellular subscribers through the mobile station display, such as dialed number confirmation, information messages or menu options, is not so readily accessible to a blind subscriber. Furthermore, operation and charging for use of a cellular mobile station often depends in part on subscriber location within the cellular service area. Such precise location information is also not normally accessible to a blind subscriber. This lack of information may then restrict efficient and effective use of the mobile station and cellular telephone network by the blind subscriber. There would be an advantage then to providing blind or otherwise visually impaired subscribers with important network transmitted textual information in an audible format.

SUMMARY OF THE INVENTION

To deliver cellular telephone network textual messages to visually impaired subscribers in accordance with the present invention, the textual messages are converted into an audible format and delivered to be heard by the subscriber instead of seen. In a first embodiment of the invention, a call set-up to the intended subscriber mobile station recipient of the message is completed. The textual message is then processed by a network connected audio device (like an announcement machine or a voice synthesizer) to generate a corresponding audible message, and the generated audible message is sent over that call connection to the mobile station for presentation to the subscriber. In another embodiment, the textual message is delivered in a conventional manner as a data message to the mobile station for the intended recipient subscriber. A voice synthesizer in the mobile station then performs a text-to-voice conversion to generate the corresponding audible message for presentation to the subscriber.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a block diagram of a cellular telephone network;

FIG. 2 is a schematic diagram of a cellular service area including sub-areas;

FIG. 3 is a block diagram of a mobile station facilitating audible presentation of textual information to visually impaired subscribers;

DETAILED DESCRIPTION OF THE DRAWINGS

Figure 4:
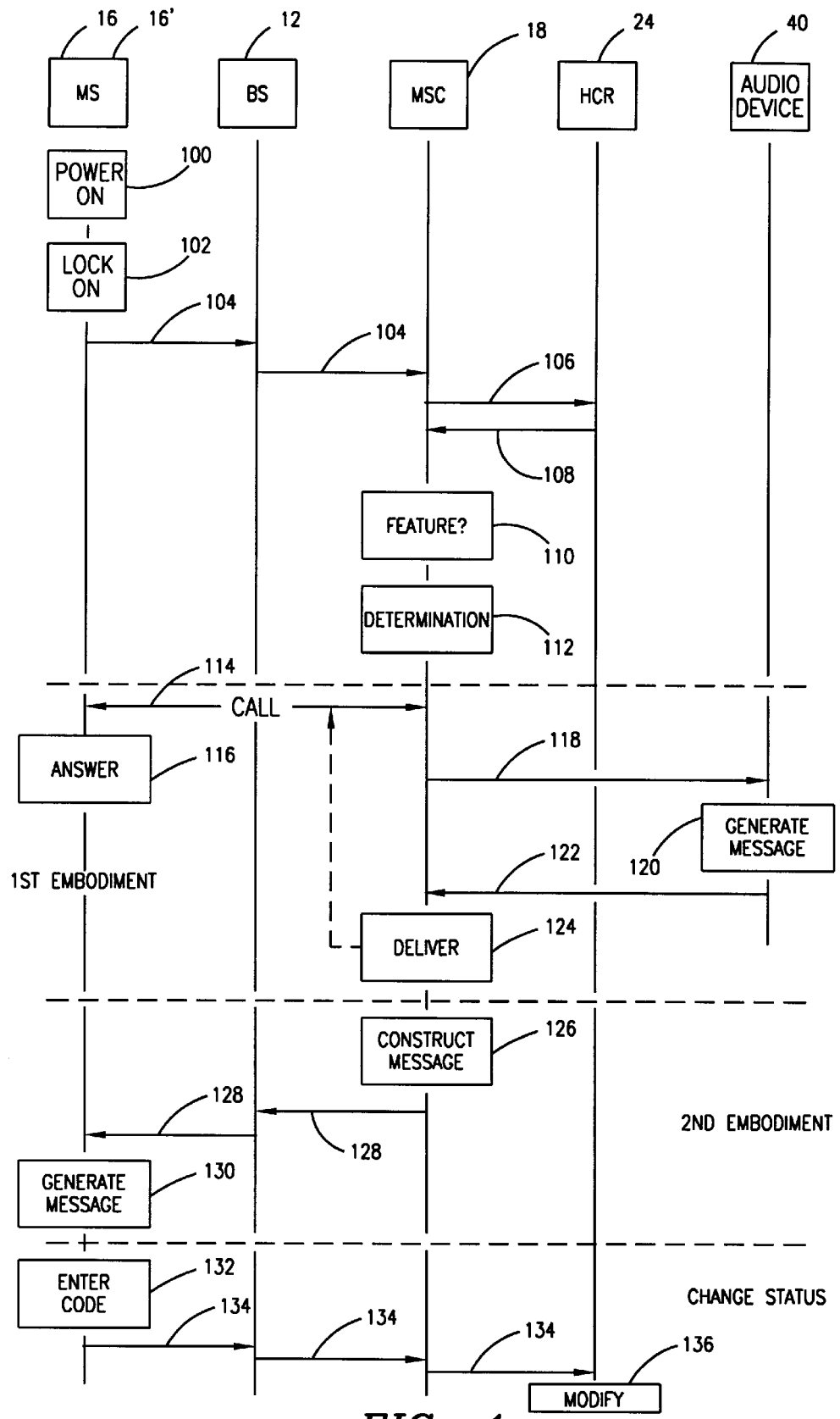
FIG. 4 is a signal flow and network operation diagram illustrating operation of the cellular telephone network of FIG. 1 in registering a mobile station to provide textual information delivery to visually impaired subscribers in an audible format.

Reference is now made to FIG. 1 wherein there is shown a block diagram of a cellular telephone network 10. The network 10 includes a plurality of base stations (BS) 12 (only two shown) for effectuating radio frequency communications over an air interface 14 with proximately located mobile stations 16. Each base station 12 is connected through a mobile switching center (MSC) 18 to other mobile switching centers (not shown) within the cellular network 10, with at least one of the mobile switching centers connected to a fixed telephone network 20 (comprising a public switched telephone network (PSTN) or other equivalent telephone network).

The network 10 maintains a record in a visitor location register 22 accompanying each mobile switching center 18 (in addition to that maintained in the network home location register 24) of mobile station 16 service features, operating parameters and location. Each mobile switching center 18 operates to control associated base station 12 operation. The mobile switching centers 18 further switch within the network 10, and with the fixed telephone network 20, cellular telephone calls originated by or terminated at the mobile stations 16. Operation of the network 10 in this fashion is well known to those skilled in the art, and thus further description will not be provided.

While the cellular telephone network 10 is illustrated as having only two base stations 12, it will, of course, be understood that such a network 10 would typically include many more base stations, and that the depiction of only two base stations is to be taken as an illustration of, rather than a limitation on, the operation of the present invention. It will further be understood that cellular telephone networks like the network 10 typically include far more than a single mobile station 16 operating within the network 10 at any one time. The depiction of only one mobile station 16 then is to be taken as an illustration of, rather than a limitation on, the operation of the present invention. Finally, although only one mobile switching center 18 is shown to simplify the illustration, it will be understood that the network 10 typically will include many mobile switching centers interconnected to each other (perhaps through the fixed telephone network 20), with each mobile switching center being connected to a plurality of base stations 12.

The cellular telephone network 10 further supports a short message service (SMS) for use by subscribers in conjunction with their conventional voice cellular telephone service. The purpose of the short message service is to provide a means for transferring textual messages between short message entities (SMEs) 23 using the communications environment provided by the cellular telephone network 10. The short message entities 23 participating in the short message service comprise short message terminals (SMT) 25 connected to the fixed telephone network 20. The short message entities 23 further comprise the subscriber mobile stations 16 operating within the cellular telephone network 10. Short message service messages must originate with or terminate at one of the subscriber mobile stations 16.

A short message service center or message center (MC) 26 is connected to the fixed telephone network 20 and to the cellular telephone network 10 (through one of the mobile switching centers 18). The message center 26 functions as a store and forward center for receiving and delivering short message service messages between the short message entities 23. In those instances where delivery of a short message service message to a short message service entity 23 fails, the message is stored in the message center 26, to be subsequently retrieved by the addressee short message entity at a later time.

The cellular telephone network 10 further includes an audio device 40 connected to the mobile switching center 18 using both a data/signaling connection 46, as well as a voice connection 48. The audio device 40 comprises an announcement machine 42 and a voice synthesizer 44. The announcement machine 42 stores a plurality of pre-recorded audible announcements available for selection and play back. The voice synthesizer 44, on the other hand, performs a text-to-voice translation function to synthesize an audible announcement from the contents of a received textual data message.

Responsive to receipt of a data signal or message from the mobile switching center over data connection 46, the audio device 40 generates a corresponding audible announcement for transmission back to the switch over the voice connection 48. In this connection, the data signal may specify play-back and output by the announcement machine 42 of a certain one of the pre-recorded audible announcements. Alternatively, the data message may comprise the text of the announcement message itself, with the synthesizer 44 performing text-to-voice conversion to generate and output the corresponding audible announcement. Once received by the mobile switching center 18 over the voice connection 48, the audible announcement is routed for delivery over a switch selected voice communications link. This voice communications link may include as a part thereof a call connection and a voice channel over the air interface 14 when the audible announcement is intended for delivery to a mobile station 16. Although illustrated as a separate node within the network 10, it will be understood that the audio device 40 may actually be a component part of the mobile switching center 18.

The air interface 14 may be of either the time division multiple access (TDMA) type, code division multiple access (CDMA) type, or other type of air interface (for example, QPSK, FSK, FM, etc.). Preferably, but not necessarily, the air interface 14 supports the transmission of short message service messages. Short message service message transmissions with respect to a TDMA type interface, for example, are specified in TIA IS-136, and a CDMA type interface supporting short message services is specified in TIA IS-95. Alternatively, the air interface 14 may be of the conventional TDMA type which does not support short message services (see, for example, mobile station operation pursuant to TIA IS-54B or EIA-553). The air interface 14 typically includes a plurality of traffic channels used for carrying voice communications and at least one control channel used for carrying the control signals (commands) that direct operation of the system. The control signals include incoming call signals, outgoing call signals, page signals, page response signals, location registration signals, voice channel assignments, maintenance instructions, and cell selection or reselection instructions.

Short message service messages may be transmitted over the air interface 14 using either a selected one of the traffic channels or the control channel. It is preferred, however, that as much short message service messaging traffic as possible be routed over the control channel so as to not adversely impact on the availability of revenue generating communications resources for the mobile stations 16. The revenue generating resources comprise the plurality of traffic channels.

Mobile stations 16 operable within the cellular telephone network 10 are used not only by normally sighted subscribers, but also by blind subscribers. They are not always, however, used with equal efficiency and effectiveness. For example, a blind subscriber cannot make advantageous use of the mobile station display to receive short message service messages, system area information, charging information, and location information. Notably, the same may be said for normally sighted subscribers in some instances such as when the subscriber is operating a vehicle. Thus, the phrase "visually impaired" as used herein refers not only to blind subscribers, but also to normally sighted subscribers who for some reason at a particular moment cannot direct their attention to the mobile station display to be made aware of certain transmitted and presented textual information.

Reference is now made to FIG. 2 wherein there is shown a schematic diagram of a cellular service area 32. The service area 32 is divided to include a plurality of overlapping and/or adjacent sub-areas 34, with each sub-area related to, for example, a particular location area or service provider. As a mobile station 16 roams throughout the service area 32, for example, in the direction indicated by arrow 36, it passes through several of the sub-areas. Each sub-area 36 may have assigned to it a different charging rate for cellular telephone calls. For example, sub-area 34(1) comprises a downtown commercial geographic area having an assigned first rate for cellular calls, while sub-area 34(2) comprises a suburb residential geographic area having an assigned second rate for cellular calls. Furthermore, the various sub-areas 34 may not all support the same calling features and services. For example, sub-area 34(3) may support short message services, while sub-area 34(4) does not support this feature.

Subscribers may be generally told which geographic areas have particular charging rates, or support certain cellular network calling features and services. Normally sighted subscribers may then look for and recognize certain landmarks (buildings, parks, street names) as being present within or marking the boundaries of certain sub-areas 34 within the cellular service area 32, and then govern their calling activities accordingly to obtain desired services at known rates. Visually impaired subscribers, however, are put at a disadvantage in this regard because they do not have ready access to geographic position information with the requisite particularity to make such sub-area position determinations, and thus may undesirably incur certain calling charges or be unable to obtain a desired service. Furthermore, in some cases geographic, charging, and other information is presented textually to the subscriber by means of the mobile station display, but may not be recognized by the visually impaired subscriber. To assist the visually impaired subscriber in the effective and efficient use of the cellular telephone network 10, the network of the present invention delivers network transmitted textual messages to subscribers in an audible format.

Reference is now made to FIG. 3 wherein there is shown a block diagram of a mobile station 16 or 16' facilitating audible presentation textual information. The mobile stations 16 and 16' include a processor (CPU) 59 connected to a transceiver 54 operable on a number of different channels of the cellular telephone network air interface. An output signal from the processor 59 selects the channel on which the transceiver 54 operates for communication over the air interface 14. An antenna 56 is connected to the transceiver 54 for transmitting and receiving radio communications (both voice and data) to and from the base station 12 of FIG. 1. A data storage device 58 (preferably in the form of a read only memory—ROM—and a random access memory—RAM) is also connected to the processor 59. The data storage device 58 is used for storing programs and data executed by the processor 59 in controlling operation of the mobile station 16 and 16' to implement conventional mobile station operations and functions well known to those skilled in the art as well as the functions of the present invention. The mobile stations 16 and 16' further include a microphone 60 and a speaker 62 connected to the processor 52 for facilitating telephonic voice communications. In the mobile station 16' only, however, a voice synthesizer 64 is connected to both the processor 59 and speaker 62. The voice synthesizer 64 receives textual data messages from the processor 59 (comprising for example received short message service messages), and in response thereto performs a text-to-voice translation generating corresponding audible messages for delivery to a visually impaired subscriber using the speaker 62. A display panel 66 and a keypad 68 are also included in the mobile stations 16 and 16' and connected to the processor 52. It is via the display panel 66 that visual indication of textual information such as short message service messages is provided to a subscriber. Entry of mobile station 16 and 16' operation commands is made through the keypad 68.

Reference is now again made to FIG. 1, and also to FIG. 4 wherein there is shown a signal flow and network operation diagram illustrating operation of the cellular telephone network 10 in registering a mobile station 16 or 16' to provide textual information delivery to visually impaired subscribers in an audible format. At mobile station 16 or 16' powering on (action 100), the mobile station locks on (action 102) to a selected control channel (analog or digital) supported by the cellular air interface 14. A registration signal 104 is then sent over the air interface 14 through the base station 12 to the currently serving mobile switching center 18. If the mobile switching center 18 does not have a temporary record in its visitor location register 22 for that mobile station, the mobile switching center retrieves the subscriber record for that registering mobile station from the home location register 24 using signals 106 and 108. This subscriber record includes, in addition to that information well known to those skilled in the art (like call transfer numbers), a non-seeing subscriber (NSS) field or fields identifying whether the subscriber has activated a feature for supporting audible delivery of certain network transmitted textual message information. If the mobile switching center 18 determines that the subscriber has activated the non-seeing subscriber feature (action 110), a determination is made (by action 112) as to the sub-area 34 (FIG. 2) within which the subscriber mobile station 16 or 16' is currently located. Alternatively, or in addition, a determination of any other network information pertinent to the subscriber is made by the action 112 (like charging rates or service providers).

In one embodiment, the mobile switching center 18 then establishes a voice (call) connection 114 with the mobile station 16 through the base station 12 and over a voice channel (either analog or digital) of the air interface 14. Following subscriber answering of that call (action 116), a signal 118 is sent to the audio device 40 identifying the determined sub-area within which the subscriber mobile station 16 is currently located (and/or the determined pertinent network information). The audio device 40 then generates (action 120) a corresponding audio message (audible announcement) using either the announcement machine 42 or the voice synthesizer 44. The generated audio message 122 is sent back to the mobile switching center 18 and delivered (action 124) to the subscriber over the voice connection 114. In an alternative embodiment, the mobile switching center 18 constructs a short message service message identifying the determined sub-area within which the subscriber mobile station 16' is currently located (action 126) and/or the determined pertinent network information, and sends (signal 128) the short message service message (including a special parameter specifying audible message delivery) to the subscriber mobile station 16' over a control channel of the air interface 14 in the conventional manner. Recognizing the included special parameter, however, the mobile station 16' then utilizes its voice synthesizer 64 to generate an audible message from the received textual short message service message (action 130). If the non-seeing subscriber feature is not activated at the point of mobile station 16 or 16' powering up, or if the non-seeing subscriber fields indicate a restriction as to delivery of the action 112 determined network information, no audible message is provided to the subscriber.

At any point in time, the subscriber, through his or her mobile station 16 or 16', may change the activation status of the non-seeing subscriber feature and the contents of any of the other non-seeing subscriber fields which may specify restrictions on the message delivery desired by the subscriber. In connection therewith, the subscriber enters (action 132) a particular feature code, and transmits a signal 134 indicative thereof over the air interface 14, through the base station 12 and the mobile switching center 18, to the home location register 24. An appropriate modification (action 136) of the subscriber record is then made, with the revised non-seeing subscriber activation status and field contents delivered to the mobile switching center 18 with the next mobile station 16 or 16' registration (signal 104) and/or subscriber record retrieval (see, signals 106 and 108). In this connection, selection by the subscriber of either of the foregoing embodiments with respect to delivery of the audible message may be made by modifying a particular one of the non-seeing subscriber fields. Restriction to audible delivery of only certain type of network transmitted textual messages may also be specified through modification of the non-seeing subscriber fields.

Each time the mobile station 16 or 16' moves into a new sub-area 34 (see, for example, movement along arrow 36 in FIG. 2), it generates and sends a registration signal 104 to the serving mobile switching center 18. For each registration in a new sub-area 34, the process illustrated in FIG. 4 following initial mobile station powering up is performed, and if the subscriber has activated the non-seeing subscriber feature, an audible message identifying the determined sub-area within which the subscriber mobile station 16 or 16' is currently located (and/or other determined pertinent network information) is then delivered to the subscriber. This delivery may be made by means of a call to the mobile station 16, or through mobile station voice synthesis of a delivered textual short message service message by mobile station 16'. Accordingly, the visually impaired subscriber is audibly made aware of sub-area change related information such as: entry into a new location area; a change in cellular service providers; or, a rate change for cellular calls.

Figure 5:
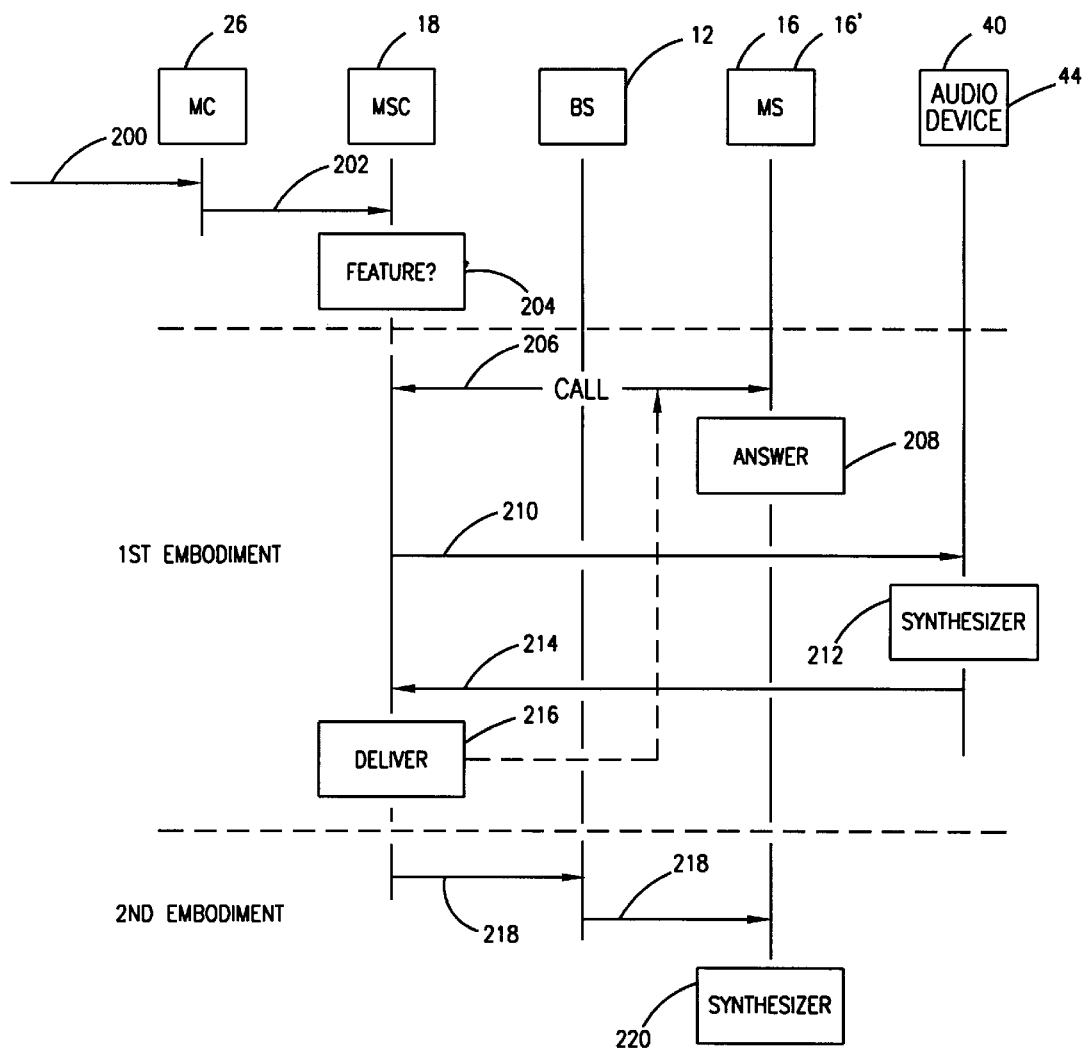
FIG. 5 is a signal flow and network operation diagram illustrating operation of the cellular telephone network of FIG. 1 in providing textual short message service message delivery to visually impaired subscribers in an audible format.

Reference is now again made to FIG. 1, and also to FIG. 5 wherein there is shown a signal flow and network operation diagram illustrating operation of the cellular telephone network 10 of FIG. 1 in providing textual short message service message delivery to visually impaired subscribers in an audible format. A short message service message 200 intended for delivery to the mobile station 16 or 16' is received at the message center 26 from a short message entity 23 comprising either a short message terminal 25 or another mobile station. A short message service delivery point-to-point (or point-to-multi-point) invoke communication 202 is then generated at the message center 26 and routed (in accordance with the information stored in the home location register 24 and visitor location register 22) through the cellular telephone network 10 until it reaches the mobile switching center 18 serving the base station 12 for the cell where the addressee mobile station 16 or 16' is currently located.

At this point, the serving mobile switching center 18 checks (action 204) the subscriber record stored in the visitor location register 22 (or home location register 24—not shown) to determine whether the addressed subscriber for the short message service message 200 has activated the non-seeing subscriber feature and indicated permission in the non-seeing subscriber fields for audible delivery of short message service messages. If not, short message service message delivery to the mobile station 16 or 16' via the base station 12 is made in the manner well known to those skilled in the art for presentation on the included mobile station display. If the feature is activated and delivery is permitted, however, in accordance with a first embodiment, the mobile switching center 18 then establishes a voice (call) connection 206 with the mobile station 16 through the base station 12 and over a voice channel (either analog or digital) of the air interface 14. Following subscriber answering of that call (action 208), the textual short message service message is sent 210 to the audio device 40 for text-to-voice conversion (action 212) by the synthesizer 44 into a corresponding audio message (audible announcement). The generated audio message 214 is then sent back to the mobile switching center 18 and delivered (action 216) to the subscriber over the voice connection 206. An advantage of this embodiment is that it supports short message service message delivery to subscribers in those instances where the air interface 14 used by the mobile station 16 does not support conventional textual/data type short message service message delivery. In an alternative embodiment, the mobile switching center 18 sends the short message service message (including a special parameter specifying audible message delivery) to the subscriber mobile station 16' (signal 218) over a control channel of the air interface 14 in a conventional manner. Recognizing the included special parameter, however, the mobile station 16' utilizes its voice synthesizer 64 to generate an audible message from the received short message service message (action 220). Again, the execution by the network 10 of one of the foregoing embodiments for effectuating audible message delivery is made in accordance with the contents of the non-seeing subscriber fields.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for implementing a service feature for audibly delivering a textual message to a cellular telephone network subscriber, comprising the steps of:

storing subscriber data in a network register, the subscriber data indicating whether the subscriber has activated a feature for supporting audible delivery of textual messages;

determining, in response to a receipt of the textual message, whether the subscriber has activated a service feature for audibly delivering textual messages by examining the stored subscriber data; and if the service feature has been activated, performing the steps of:

transmitting the textual message and a parameter specifying audible delivery of the textual message as a data communication to a mobile station for the subscriber;

generating by the mobile station of an audible message corresponding to the textual message of the data communication; and delivering the audible message to the subscriber through the mobile station.

2. The method as in claim 1 wherein the step of generating comprises the step of performing a text-to-voice translation of the textual message of the data communication to synthesize the audible message.

3. The method as in claim 1 wherein the textual message comprises a short message service message.

4. The method as in claim 1 wherein the textual message comprises geographic location information.

5. The method as in claim 1 wherein the textual message comprises cellular call charging rate information.

6. The method of claim 1 wherein the network register comprises a visitor location register and the step of determining whether the subscriber has activated the service feature comprises retrieving the subscriber data stored in the visitor location register.

7. The method of claim 1 wherein the network register comprises a home location register and the step of determining whether the subscriber has activated the service feature comprises retrieving the subscriber data stored in the home location register.

8. A cellular telephone network, comprising:

a mobile station assigned to an addressee subscriber;

a base station in radio frequency communication with the mobile station;

a network register storing an indication that the addressee subscriber has activated a feature for supporting audible delivery of textual messages; and a mobile switching center connected to the base station and receiving an audible message corresponding to a textual message intended for delivery to the addressee subscriber, the mobile switching center determining that the addressee subscriber has activated the feature by examining the indication stored in the network register establishing a voice call connection with the mobile station through the base station to deliver the received audible message to the addressee subscriber.

9. The cellular telephone network as in claim 8 further including an audio device for receiving the textual message intended for delivery to the addressee subscriber and generating the audible message delivered by the mobile switching center over the voice call connection.

10. The cellular telephone network as in claim 9 wherein the audio device comprises an announcement machine storing pre-recorded audible messages corresponding to certain selected textual messages.

11. The cellular telephone network as in claim 9 wherein the audio device comprises a text-to-voice translator for synthesizing the audible message from the textual message.

12. The cellular telephone network as in claim 9 further including a message center originating a short message service message delivery attempt comprising the textual message to the addressee subscriber, the audio device generating the audible message corresponding to the textual message for delivery by the mobile switching center over the voice call connection.

13. The cellular telephone network as in claim 9 wherein the textual message comprises geographic location information converted to the audible message by the audio device for delivery by the mobile switching center over the voice call connection.

14. The cellular telephone network as in claim 9 wherein the textual message comprises cellular call charging rate information converted to the audible message by the audio device for delivery by the mobile switching center over the voice call connection.

15. The system of claim 8 wherein the network register comprises a home location register.

16. The system of claim 8 wherein the network register comprises a visitor location register.

* * * * *